United States Patent Office 2,973,480
Patented Feb. 28, 1961

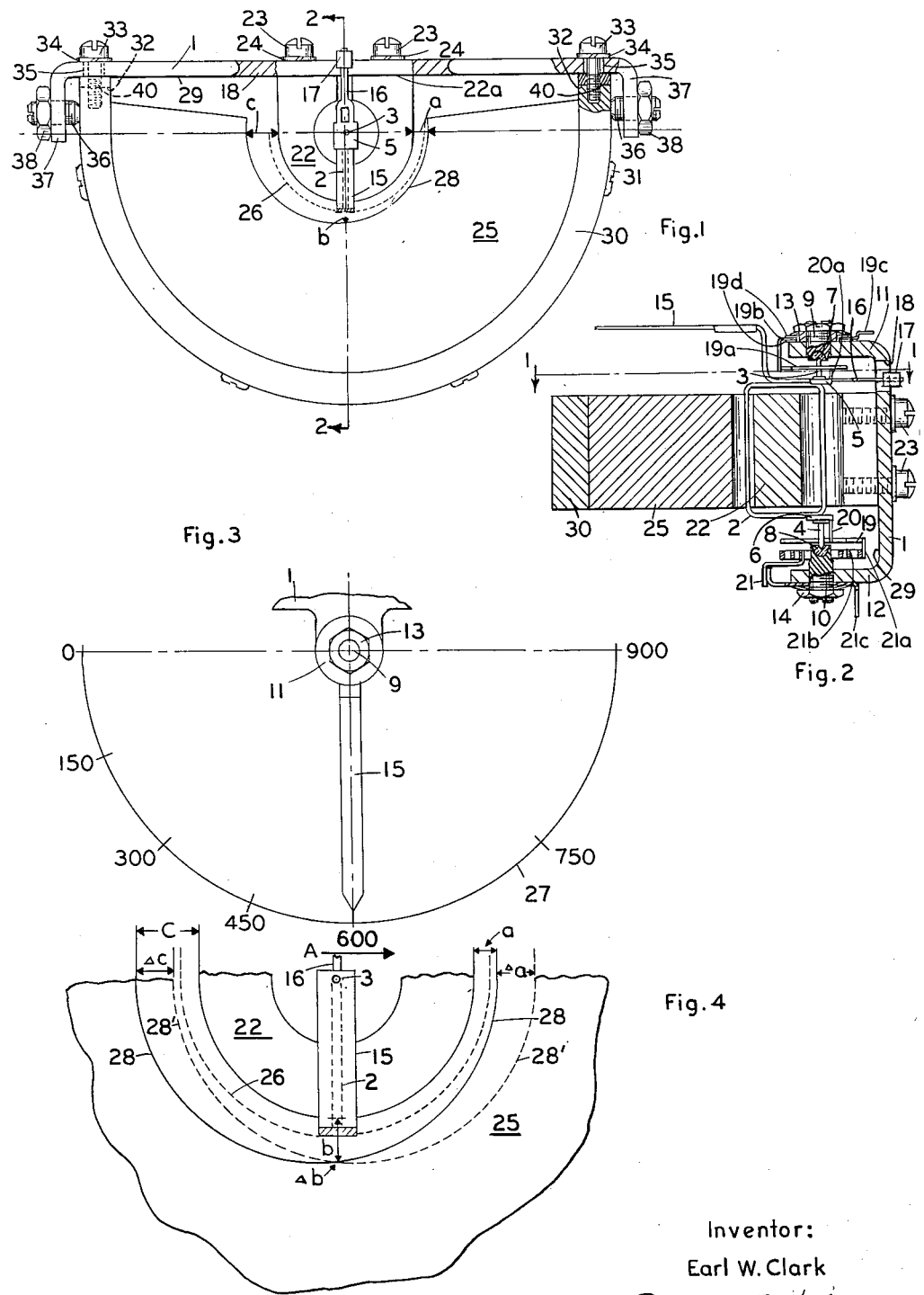

2,973,480

NON-LINEAR SCALE ELECTRICAL MEASURING INSTRUMENT

Earl W. Clark, Saugus, Mass., assignor to General Electric Company, a corporation of New York Filed Apr. 25, 1958, Ser. No. 730,935

5 Claims. (Cl. 324—150)

This invention relates to electrical measuring instruments of the moving coil, permanent magnet type, known as the D'Arsonval type; and more particularly to instruments having a non-linear scale distribution, i.e., having some portion of the scale expanded.

It is well known to provide an instrument of this general type having a non-linear scale by establishing an air gap between the core associated with a moving coil and a stationary magnet, such that the width of the air gap varies over the range of angular movement of the moving coil relative to the magnet. The magnetic coupling of the coil and magnet is varied by changing the width of the air gap; therefore, the deflection of the coil responsive to a given change in a measured electric current applied thereto may be varied in accordance with changes of the air gap width along the path of the moving coil.

Final adjustment and calibration of an instrument of this type may be accomplished by moving the stationary magnet relative to the moving coil to establish the geometry of the air gap between these elements. However, this method has not been entirely satisfactory because no satisfactory means have hitherto been devised to limit an adjustment of the air gap width to only a portion of the scale, thereby to establish a desired calibration of that portion, and to prevent a change in the air gap width over the remainder of its length, which would disturb the adjustment and calibration of the entire scale.

It is the object of this invention to provide an electrical measuring instrument of the D'Arsonval type, having a non-linear scale and a varying air gap over the range of angular movement of the coil, in which improved means are provided for adjustably establishing the air gap over a portion of its length, and for preventing substantial alteration of the air gap over another portion of its length, so that the latter portion may be independently calibrated.

Briefly stated, in accordance with one aspect of this invention, there is provided a movement for an electrical measuring instrument comprising a frame having a plane or reference face on which are mounted a rotatably movable coil, a core associated with the coil, and a circular arcuate magnet. The magnet is secured to the frame and radially spaced about the path of rotation of the coil and the core so as to form an arcuate gap therebetween. The magnet is mounted by means which are adjustable so as to enable movement of the magnet in a direction which is parallel to the plane face of the frame and which lies in a plane perpendicular to the rotational axis of the coil, so that the arcuate gap can be adjusted in this direction. By these means, the scale distribution of the meter may be adjusted, and the meter may be calibrated, over one region of the scale, without materially affecting a pre-established scale adjustment and calibration over another region of the scale.

Further objects and advantages of this invention will become apparent from the following description, reference being had to the accompanying drawing, and the features of novelty which characterize this invention will be pointed out in the claims.

Figure 1 is a plan view, partially in section of a meter movement embodying one form of the invention, taken along the line 1—1 in Figure 2, looking in the direction of the arrows.

Figure 2 is a sectional elevation of the meter movement, taken along the line 2—2 in Figure 1, looking in the direction of the arrows.

Figure 3 is a diagrammatic representation of a typical scale arrangement for use with the meter movement of Figures 1 and 2.

Figure 4 is a fragmentary plan view, partially in section, of the meter movement of Figure 1, demonstrating the effect on the geometry of the air gap of an adjustment of the magnet.

Referring to Figures 1 and 2, there is shown a meter movement embodying this invention. It is to be understood that the meter movement may assume any modified form suitable for specific applications, as will be understood by those skilled in the art. A paramagnetic frame 1 for supporting the elements of the meter movement in appropriate relation is provided, and may be formed with suitable means for mounting the meter movement within instrument casing (not shown). A movable coil 2 is pivotally mounted on frame 1 by means of bearing members 3 and 4 affixed to the coil along its rotational axis by any suitable means, such as bracket members 5 and 6, which may be cemented or otherwise secured to the coil. Bearing members 3 and 4 are pivotally mounted in studs 9 and 10. Frame 1 is provided with spaced-apart parallel extensions 11 and 12 to support coil 2 by means of studs 9 and 10, which are threaded into tapped holes formed in extensions 11 and 12, respectively. In order to avoid accidental displacement of studs 9 and 10, suitable locking means such as nuts 13 and 14, respectively, are threaded thereon and locked against the outer surfaces of extensions 11 and 12, respectively.

A suitably formed visual indicator or pointer 15 is affixed to the movable coil 2 by means of bracket 5. Means are provided for dynamically balancing the coil, comprising an arm 16 and counterweight 17, which are also secured to the coil by means of bracket 5. Interference of arm 16 with frame 1 is prevented by an opening 18 formed in frame 1. Coil 2 is urged to a zero position by means of two spiral springs 19 and 19a, one end of each being secured to coil 2 by means of short strips 20 and 20a. The other end of spring 19 is connected by means of connector 21a to bimetal temperature compensator 21b which is connected in turn through strip 21 to 21c, one of the electrical input terminals to the coil 2. The other end of spring 19a is attached to tab 19b which is part of the adjustable zero set mechanism which includes extension arm 19c, the remaining input terminal to the coil 2. Part 19d is a thin insulation bushing used to electrically insulate the zero set mechanism from the frame 1 and stud 9. Rotational movement of the coil is thus resiliently opposed by the action of spiral springs 19 and 19a, providing a resisting torque proportional to the amount of deflection of the coil from the zero position.

A generally annular core 22 of paramagnetic material is placed through the coil in order to increase the flux density of a magnetic field to be applied thereto, as is conventional in instruments of this general type. Frame 1 is formed with a plane surface 29 to cooperate with a flattened side 22a of core 22 for mounting the core upon this plane surface by means of suitable fasteners, such as cap screws 23 and lock washers 24.

The mechanism thus far described is of a generally conventional nature. This mechanism comprises the moving coil portion of a meter of the D'Arsonval type designed to be placed in a circuit carrying an electrical current whose magnitude is to be measured. The current to be measured flows through the coil, and produces a magnetic field which interacts with a fixed magnetic field provided by magnet 25 to produce a deflection of the coil 2 against the bias of springs 19 and 19a. The deflection torque is proportional to gap flux density and the current being measured. The restoring torque of the springs is proportional to deflection and the resultant coil deflection is that where the deflecting and restoring torques are equal.

It is convenient to employ a permanent magnet of fixed magnetic intensity in instruments of this kind, and the flux density in the region of the coil is thus variably controllable by the magnetic coupling between the permanent magnet and the core. The magnetic coupling may be varied by varying the air gap between the permanent magnet and the core. It is conventional practice to provide for a non-linear scale, i.e., one in which the deflection of the coil for a given change in the measured electrical quantity varies at different points on the scale, by providing a non-uniform air gap between the core and the permanent magnet over the range of angular movement of the coil.

In the embodiment of the invention shown in the drawings, an arcuate normally radially magnetized permanent magnet or magnetic member 25 is provided. It should be understood that although an arcuate magnet of approximately semicircular configuration is shown by way of example, magnet 25 may have any shape and arc length corresponding to the required arc length of the scale desired. Furthermore, magnet 25 may be in the form of an arc of any other specially desired curve, and is shown as a circular arcuate form only by way of example. Correspondingly, core 22 may be of any desired shape and arc length. Magnet 25 may be magnetized other than radially should requirements warrant special directionalization.

Magnet 25 is so formed and positioned relative to the rotational path 26 of coil 2 and core 22 as to establish a geometry of the air gap therebetween which will provide for a desired non-linear scale distribution. An example of a non-linear scale which may be employed with the meter movement of the invention is shown in Figure 3. In this figure, a scale 27 is shown in which succeeding 90° deflections represent 0–600 units and 600–900 units. It will be noted that the scale progressively expands with increasing readings. Such an arrangement is desirable, for example, in an engine temperature instrument.

Referring again to Figure 1, it will be seen that magnet 25 is so positioned that the air gap existing between face 28 of magnet 25 and core 22 progressively decreases from a position corresponding to the zero point of the scale in Figure 3, to a position corresponding to the 900-unit point in Figure 3. The air gap existing at these points is denoted by $c$ and $a$, respectively, and the air gap at an intermediate point spaced 90° from $a$ and $c$ is designated $b$. Magnet 25 is mounted on frame 1 by means which permit adjustment and calibration of the air gap in a direction parallel to the plane face 29 of frame 1, and in a plane perpendicular to the rotational axis of coil 2 with no significant effect on the air gap in a direction perpendicular to face 29; that is, which will permit adjustment of portions of the air gap in regions near points $a$ and $c$, but which will not substantially affect the portion of the air gap in the region of $b$. This adjustable mounting will now be described.

Magnet 25 is secured to a semi-circular ring element 30 by suitable means, such as soldering, or cap screws 31 screwed into inserts (not shown) in magnet 25. Circular ring element 30 is also used as a magnetic shield for the magnet 25 and for the flux return path of magnet 25. Flattened ends 32 of ring element 30 abut upon plane or reference face 29 of frame 1, and are adjustably secured thereto by suitable means, such as cap screws 33 and lock washers 34. In order to permit adjustment of ring element 30 along plane face 29 of frame 1, elongated openings 35 of greater length than the diameter of cap screws 33 are provided, through which cap screws 33 pass into the body of ring member 30. It will be apparent that the magnet 25 and ring element 30 may be moved rectilinearly in a direction parallel to plane face 29 of frame 1, the movement being accommodated by the enlarged openings 35.

In order to accurately adjust and firmly secure magnet 25 to its final position, set screws 36 are threaded through openings in ears 37, formed at either end of frame 1 and disposed perpendicularly to plane face 29 thereof. Set screws 36 are thus disposed with their axes substantially parallel to plane face 29. In order to secure set screws 36 in their adjusted positions, nuts 38 are threaded thereon and locked against the outer surfaces of ears 37. This adjustment is made while screws 33 are in a slightly loosened condition, after which they are fully tightened.

Figure 4 more fully demonstrates the effect of an adjustment of magnet 25 by the means just described. Magnet 25 is shown by solid lines in the original position of Figure 1, with arcuate face 28 similarly disposed relative to path 26 of coil 2. The air gap in a radial direction from the rotational axis of coil 2 at the zero point is shown by dimension $c$, the gap at the 900-unit point by dimension $a$, and the air gap at the 600-unit point by dimension $b$. It will be apparent that dimensions $a$ and $c$ are disposed parallel to plane face 29 of frame 1, and in a plane perpendicular to the rotational axis of coil 2, whereas the radial air gap dimension $b$ is disposed perpendicular to plane face 29.

To demonstrate the effect on the geometry of the air gap of an adjustment of the magnet position, the arcuate face of the magnet is shown by dotted lines in an adjusted position 28′. The change in the air gaps $a$, $b$ and $c$, is represented by the dimensions $\Delta a$, $\Delta b$ and $\Delta c$, respectively. The direction of the magnet adjustment which has taken place is shown by the arrow A. It will be readily apparent that although the portions of the air gap in the regions of $a$ and $c$ have been materially altered, there has been no substantial change in the dimension of the portion of the air gap in the region of $b$, because the adjustment A has occurred substantially tangential thereto. Thus, the dimension $\Delta b$ is minute relative to the dimensions $\Delta a$ and $\Delta c$. The changes in air gap width along the remainder of the path of rotation of the coil will be intermediate those at $a$ or $c$, and that at $b$, but will decrease substantially in the portions of the air gap adjacent $b$.

It will be readily apparent that means have been provided by which adjustment and calibration of the air gap may be carried out in the region of certain points on the scale without materially disturbing the air gap in the region of other points on the scale. In order to adjust and calibrate the meter in the region of point $b$, which corresponds to the region of the 600-unit point of the scale 27, the magnetic flux density of magnet 25 may be adjusted by initial saturation and subsequent magnetic knockdown or demagnetization to secure an appropriate deflection in the region of this point.

Alternatively, the mid-scale adjustment may also be accomplished by adjusting the gap between magnet 25 and the core 22 in a direction perpendicular to plane face 29 by inserting shimming material or flat members 40 while the appropriate current flows through the coil 2. After this initial adjustment has been completed, the full scale adjustment can be accomplished without disturbing the mid-scale adjustment by adjusting the position of magnet 25 relative to coil 2 in a direction parallel to plane face 29 of frame 1 by means of set screws 36 while the appropriate current flows through coil 2. Thus, the air gap at $a$, corresponding to 900 units on the scale 27, may be established to provide the appropriate deflection in order to secure an exact reading at this point and sufficiently accurate deflections in the adjacent regions of the air gap. It will be apparent that this adjustment and calibration will not materially affect the pre-set adjustment and calibration of the 600-unit point and the adjoining region, corresponding to the air gap in the region of dimension b. Screws 33 and nuts 38 may then be tightened to secure magnet 25 in its permanent operational position relative to frame 1.

It should be understood that the invention is not limited to specific details of construction and arrangement thereof herein illustrated, and that changes and modifications may occur to one skilled in the art without departing from the spirit and scope of the invention.

What I claim as new and desire to secure by Letters Patent of the United States is:

1. In an electrical measuring instrument, a support frame having a substantially planar portion, a first magnetic core member, a coil mounted on said frame, said coil being mounted for rotation about said first magnetic member, the axis of rotation of said coil being substantially parallel to said planar portion, an indicating member attached to said coil, a scale cooperating with said indicating member, and a second magnetic member of arcuate configuration radially spaced about the path of rotational movement of said coil so as to form an arcuate gap in which said coil may move between said magnetic members, one of said magnetic members establishing a radial magnetic field between said magnetic members, said second magnetic member being adjustably mounted on said frame by adjustable mounting means, said second magnetic member arranged for selective rectilinear movement relative to said first magnetic member in a plane perpendicular to said axis of rotation of said coil, said adjustable mounting means including a surface which cooperates with said planar portion to guide said second member in a direction parallel to said planar portion during the movement thereof, said movement varying the radial dimension of said gap substantially more in a direction parallel to said planar portion than perpendicular thereto, whereby the geometrical form of a portion of said gap may be substantially varied in order to vary the deflection characteristics of said coil along at least a portion of said path in response to a given change of current therein.

2. In an electrical measuring instrument, a support frame having a planar reference face, a coil, said coil being rotatably mounted on said frame, the axis of rotation of said coil being substantially parallel to said face, said coil being rotatable in response to current flowing through said coil, an indicating member attached to said coil, a scale cooperating with said indicating member, a core mounted on said support frame in fixed relation to said coil, a portion of said core being encircled by said coil, and a magnetic member of arcuate configuration positioned contiguous to the path of rotational movement of said coil so as to form an arcuate gap in which said coil may move between said magnetic member and said core, said magnetic member establishing a radial magnetic field between said magnetic member and said core, said magnetic member being adjustably mounted on said reference face of said support frame for selective rectilinear movement relative to said core and said coil, said movement being in a direction parallel to said reference face and in a plane perpendicular to said axis of rotation of said coil, whereby the radial dimensions of the gap are varied substantially more in a direction parallel to said reference face than in a direction perpendicular to said reference face.

3. In an electrical measuring instrument, a support frame having a substantially planar face, a coil, said coil being rotatably mounted on said frame and being rotatable in response to current flow through said coil, the axis of rotation of said coil being substantially parallel to said face, an indicating member attached to said coil, a scale cooperating with said indicating member, a core mounted on said support frame in fixed relation to said coil, said core having a portion encircled by said coil, and a magnet of substantially circular arcuate configuration radially spaced about the path of rotational movement of said coil so as to form an arcuate gap in which said coil may move between said magnet and said core, said magnet being adjustably mounted on said planar face of said frame for selective rectilinear movement relative to said coil, said mounting enabling initial adjustment of said magnet in a direction perpendicular to said face to provide mid-scale calibration, and subsequent adjustment in a direction parallel to said planar face, said subsequent adjustment being in a plane perpendicular to said axis of rotation of said coil and selectively providing a non-linear coil deflection characteristic, said non-linear characteristic being accomplished without substantially effecting said mid-scale calibration.

4. In an electrical measuring instrument, a support frame having a substantially planar face, a coil mounted on said frame, said coil being mounted for rotation in response to current flow through said coil, the axis of rotation of said coil being substantially parallel to said face, an indicating member attached to said coil, a scale cooperating with said indicating member, a core of arcuate configuration mounted on said frame in fixed relation to said coil, a magnetic member of arcuate configuration radially spaced from said core about a path of rotational movement of said coil so as to form an arcuate gap for the rotation of said coil between said magnetic member and said core, said magnetic member establishing a radial magnetic field between said magnetic member and said core, mounting means for said magnetic member comprising a support member affixed to said magnetic member and formed with a plane surface in abutting slidable relation with said planar face, means for adjusting said magnetic member relative to said coil in a direction perpendicular to said face, and fastening means adjustably affixing said support member to said frame and providing for selective rectilinear movement of said magnetic member parallel to said planar face, said movement being in a plane perpendicular to the rotational axis of said coil, whereby the dimensions of said gap may be initially adjusted through adjustment of said magnetic member in a direction perpendicular to said face, and subsequently may be adjusted through movement of said magnetic member in a direction parallel to said planar face.

5. In an electrical measuring instrument, a support frame having a substantially planar face, a core mounted on said planar face, a coil rotatably mounted on said frame, the axis of rotation of said coil being substantially parallel to said face, an indicating member attached to said coil, a scale cooperating with said indicating member, a magnetic member of arcuate configuration radially spaced about the path of rotational movement of said coil so as to form an arcuate gap in which said coil may move between said magnetic member and said core, said magnetic member establishing a radial magnetic field between said magnetic member and said core, mounting means for supporting said magnetic member relative to said core including a planar surface cooperating with said planar face, and fastening means for adjustably affixing said mounting means to said frame and providing for selective rectilinear movement of said magnetic member and said mounting means parallel to said face and in a plane perpendicular to said axis of rotation of said coil, whereby the dimensions of said gap may be adjusted.

References Cited in the file of this patent

UNITED STATES PATENTS

| | | |
|---|---|---|
| 627,908 | Davis | June 27, 1899 |
| 1,753,230 | Best | Apr. 8, 1930 |
| 2,221,643 | Lederer | Nov. 12, 1940 |
| 2,773,240 | Young | Dec. 4, 1956 |
| 2,798,200 | Swan | July 2, 1957 |
| 2,883,624 | Millar | Apr. 21, 1959 |
| 2,887,656 | Barry | May 19, 1959 |